US00RE41501E

(19) United States
(12) Reissued Patent
Watson et al.

(10) Patent Number: US RE41,501 E
(45) Date of Reissued Patent: Aug. 17, 2010

(54) ELECTRONIC DOCUMENT READER

(75) Inventors: Ben Watson, Hertfordshire (GB); Nick Sandham, London (GB); Duncan Barclay, Cambridgeshire (GB); Simon Jones, Cambridgeshire (GB); Carl Hayton, Cabridgeshire (GB); David Fisher, Middlesex (GB); Anusha Nirmalananthan, Cambridge (GB)

(73) Assignee: Plastic Logic Limited, Cambridge, Cambridgshire (GB)

(21) Appl. No.: 29/351,615

(22) Filed: Dec. 8, 2009

Related U.S. Patent Documents

Reissue of:
(64) Patent No.: Des. 585,888
Issued: Feb. 3, 2009
Appl. No.: 29/278,503
Filed: Mar. 30, 2007

(30) Foreign Application Priority Data

Feb. 7, 2007 (EM) ..... 000670286

(51) LOC (9) Cl. ..... 14-02
(52) U.S. Cl. ..... D14/341

(58) Field of Classification Search ..... D14/345, D14/482, 496, 371, 129, 373, 341–344, 346, D14/420–425, 315, 316, 318, 439–441, 432, D14/322–327, 457, 458, 447, 406.4, 114, D14/401, 454; 345/619, 173, 901, 206, 100, 345/107, 1.1, 204, 533, 1.3, 156, 169; 434/317, 434/169, 308, 178, 156, 167, 307 R, 309; 361/681, 685, 686; 369/292; 235/375, 145 R, 235/145 A; 348/836, E5.128; 358/527, 474, 358/444; D6/300, 308, 406.1–406.6, 574, D6/567, 511; 715/273; 132/216; D28/36, D28/77, 64.3, 83, 78; 206/581; 402/4; 281/22, 281/29, 51; D21/330, 333; 367/68; D19/35, D19/52, 26, 59, 60; 349/12; 178/18.03; D8/323, D8/353, 331, 344; 341/22–23; D13/119, D13/103, 156, 110; D3/212, 901; D9/424, D9/414, 435, 439, 445, 455–457, 449; 429/175, 429/176, 163–166, 136; 455/128; 174/138 F; 248/678, 441.1

See application file for complete search history.

(56) References Cited

U.S. PATENT DOCUMENTS

| | | | |
|---|---|---|---|
| D118,781 | S | 1/1940 | Landwehr |
| D262,150 | S | 12/1981 | Sussman |
| D287,418 | S | 12/1986 | Trabattoni |
| D303,582 | S | 9/1989 | Gavin |
| D362,271 | S | 9/1995 | Luong |
| D453,859 | S | 2/2002 | Spearman |
| D459,756 | S | 7/2002 | Lio et al. |
| D466,115 | S | 11/2002 | Hawkins et al. |
| D466,502 | S | 12/2002 | Hawkins et al. |
| D479,895 | S | 9/2003 | Lai |

| | | | |
|---|---|---|---|
| D480,837 | S | 10/2003 | Liu |
| D491,693 | S | 6/2004 | Chen |
| D496,134 | S | 9/2004 | Lai |

FOREIGN PATENT DOCUMENTS

| | | |
|---|---|---|
| EM | 000670252 | 2/2007 |
| EM | 000670260 | 2/2007 |
| EM | 000670278 | 2/2007 |

OTHER PUBLICATIONS

U.S. Appl. No. 29/278,502, filed Mar.30, 2007, Matthew Marsh et al.
U.S. Appl. No. 29/278,501, filed Mar. 30, 2007, Ben Watson et al.
U.S. Appl. No. 29/278,500, filed Mar. 30, 2007, Matthew Marsh et al.

*Primary Examiner*—Susan Moon Lee
(74) *Attorney, Agent, or Firm*—Knobbe, Martens, Olson & Bear, LLP

(57) CLAIM

The ornamental design for an electronic document reader, as shown and described.

DESCRIPTION

1 Claim, 2 Drawing Sheets

Figure 1:
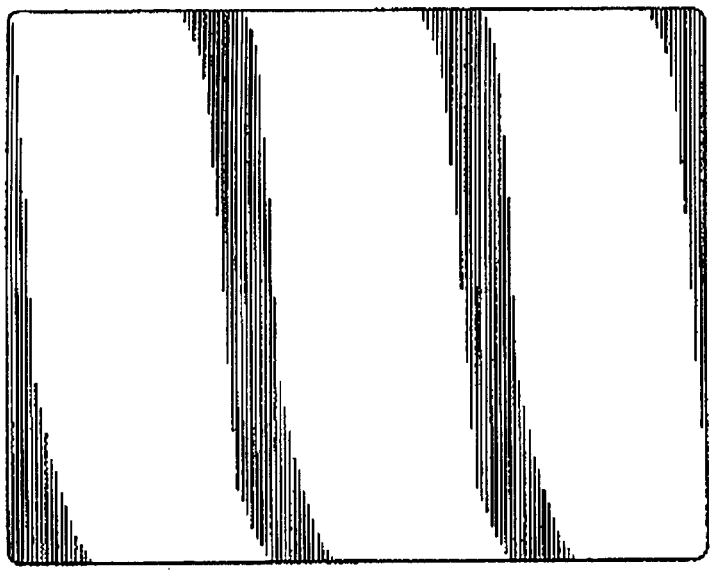
FIG 1 is a front elevational view of a first embodiment of the electronic document reader of the present design.
Figure 2:
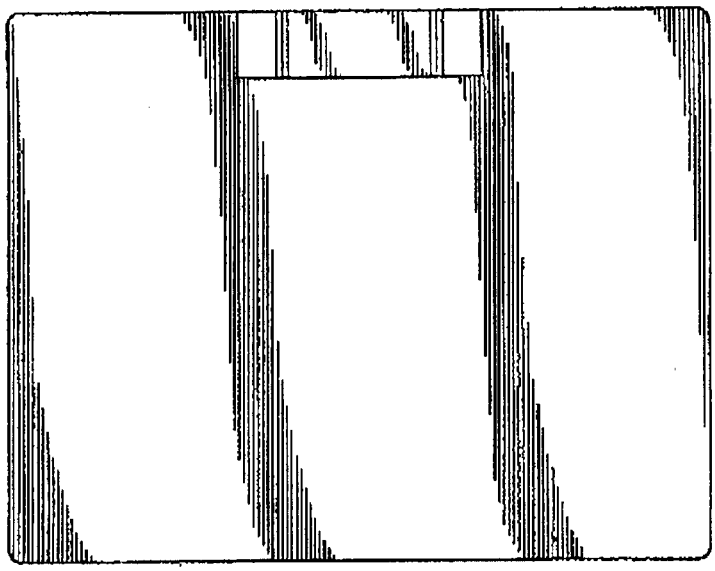
FIG 2 is a rear elevational view of the electronic document reader of FIG. 1.
Figure 3:
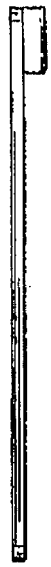
FIG 3 is a left side elevational view of the electronic document reader of FIG. 1.
Figure 4:
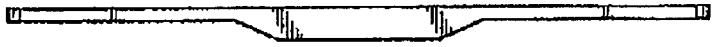
FIG 4 is a bottom side elevational view of the electronic document reader of FIG. 1; and, FIG 5 is a front, left side, and bottom side perspective view of the electronic document reader of FIG. 1.
Figure 5:
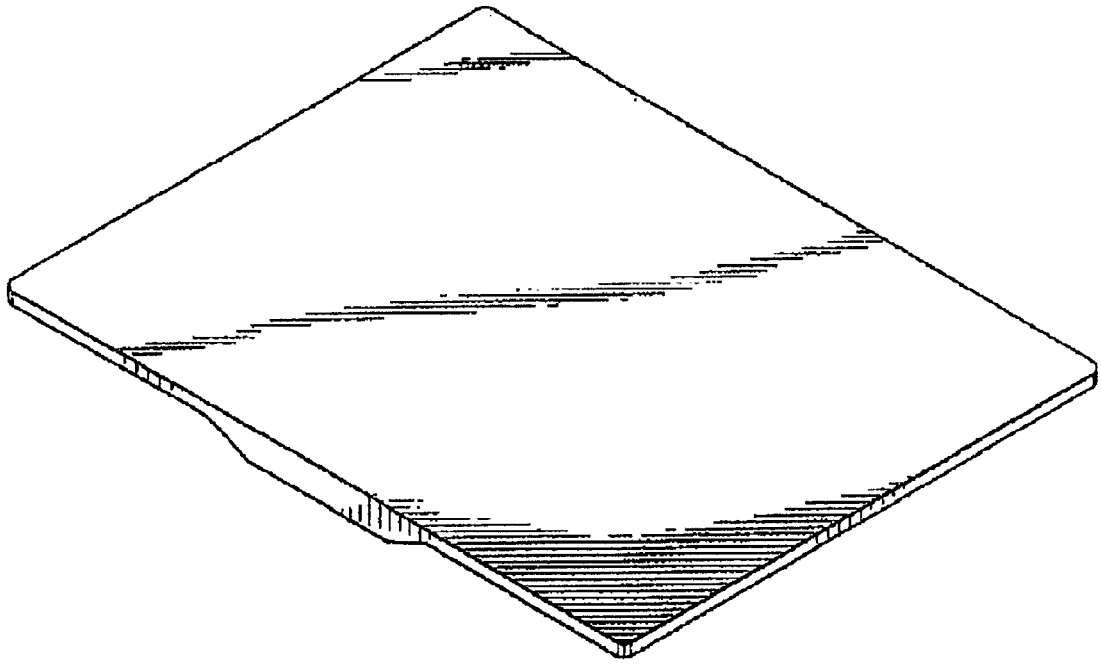

Matter enclosed in heavy brackets [ ] appears in the original patent, but forms no part of this reissue; matter printed in italics indicates the additions made by reissue.